Patented Apr. 17, 1951

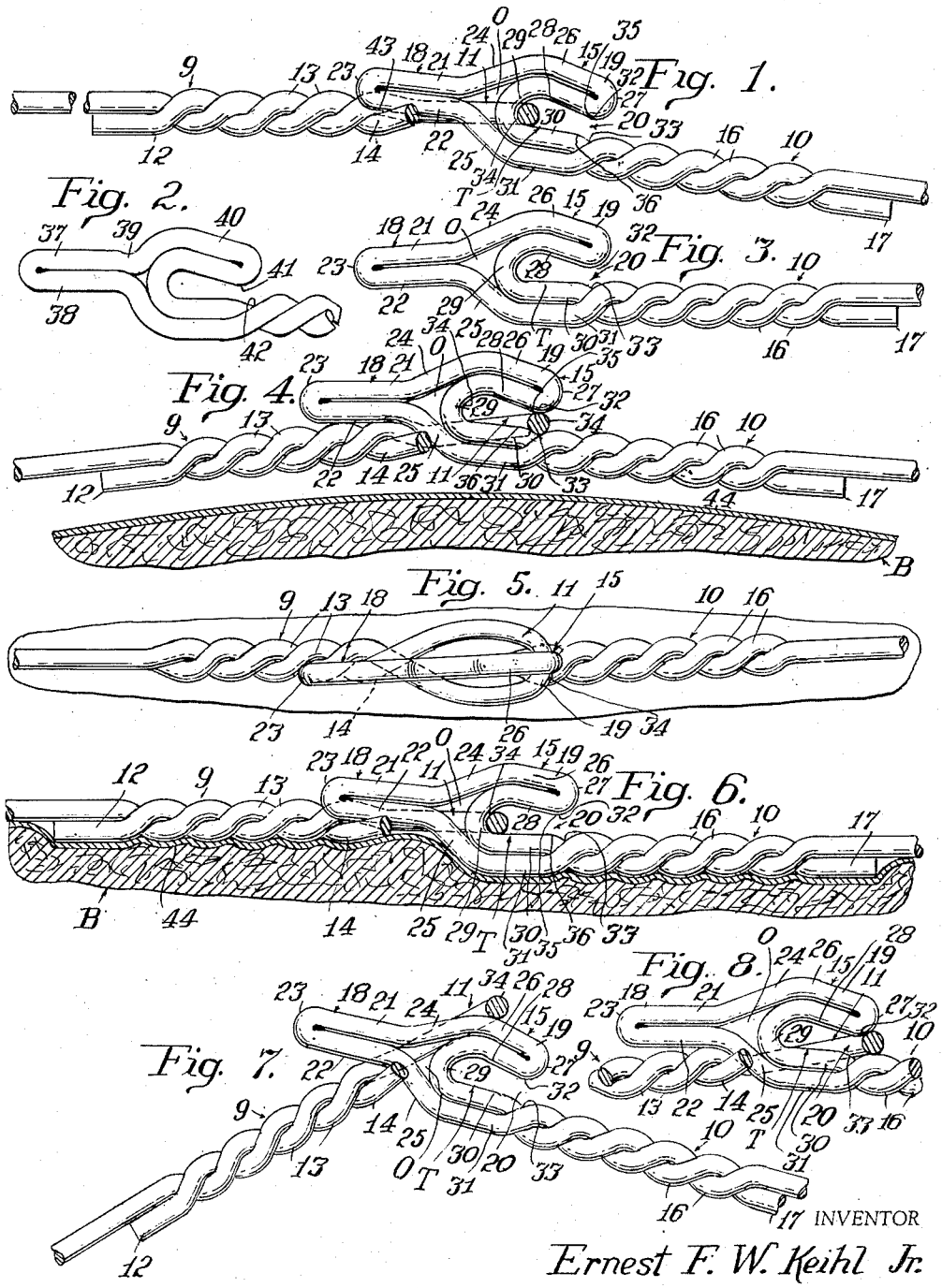

2,549,206

UNITED STATES PATENT OFFICE 2,549,206

BALE TIE

Ernest F. W. Keihl, Jr., Medina, N. Y., assignor of forty per cent to Eno Riemer, Medina, N. Y.

Application April 11, 1950, Serial No. 155,326

4 Claims. (Cl. 24—27)

This application is a continuation, in part, of my application, Serial No. 93,655, filed May 17, 1949, entitled "Bale Tie" and now abandoned.

This invention relates to a bale tie. The invention is an improvement on the bale tie of my Patent 2,223,109, November 26, 1940.

The prior art bale ties, including the bale tie in my aforesaid patent, are quite satisfactory in many respects. Nevertheless, there are certain inherent objections to such prior art bale ties. The prior art bale ties include generally a loop or eye at one end of the bale tie wire and a hook formation at the other end of the wire and which hook is adapted to enter the eye or loop and become interengaged therewith when the tie is about the material to be baled. A primary objective in baling material that is more or less compressible, say for instance hay or cotton or the like, is to effect a tight baling of the material and the prevention of the breaking of the interlocking connection between the loop and hook of the tie and, further, to prevent any accidental disengagement of the hook from the loop or eye or vice versa. Any breaking of the tie at its loop and hook connection or between its ends or any accidental or unintentional disconnection of the loop from the hook or vice versa would, of course, result in spoilage or loss of the bale of material, whatever it may be.

In the prior art bale ties of the aforesaid type, there have been occasions when the ties that were applied to bales of material such as hay or the like became accidentally or unintentionally disconnected or actually the ties became broken and, then too, with the prior art ties, the inherent construction of the same was such that a very tight baling of the compressible material or the like could not be effected and, if it was, the ties became broken, distorted or disconnected.

It is with the aforesaid state of the art in mind that I have improved the bale tie disclosed in my Patent 2,223,109, and the objections to the tie in that patent and others in the prior art, as stated supra, have now been overcome and I have produced in the present bale tie one that performs its function entirely satisfactorily as regards being incapable of accidental or unintentional release of the eye or loop and hook or breakage or distortion of the same and, yet, resulting in a tie that will effect a tighter or more compact maintenance of the baled material such as hay or other compressible material or products. In my present bale tie, the hook end thereof consists generally of an elongated bill and a particularly and peculiarly formed strut structure that is connected with the said bill and integral therewith. The throat and nose of the tie are connected with the strut structure and are integral with the said bill. The structure and arrangement of the said hook end of the bale, when properly associated with or secured to the loop at the other end of the bale wire, and particularly when the wire is under tension due to the expansion of the baled material, serves, under such conditions, to effect an interconnecton of the loop and the hook which cannot possibly become accidentally or unintentionally disconnected or distorted or disassociated. The connection of the loop and the hook actually serves to more firmly and effectively lock the two together and, thus, the difficulties and objections to the prior art bale ties are vastly improved and overcome.

Keeping in mind the foregoing and what is described and claimed hereinafter, it is an object of my invention to provide a bale tie consisting of an elongated wire with a loop or eye formation at one end thereof and a hook at the other end thereof adapted to interengage with the said loop or eye and the formation of the hook and its association and relationship with the loop or eye being such that any accidental or unintentional disconnection or distortion of the interlocked or interengaged elements is positively prevented and the material that is to be baled will be maintained in a tighter or more compressed condition than has been accomplished by the prior art bale ties.

Another object of my invention is to provide a particularly and peculiarly shaped hook as an element of a bale tie that, when used in combination with a loop or eye of a bale tie, serves to positively effect an interlocking or interengagement of the hook and eye and prevent breakage or distortion of the same when in use and to maintain the material that is compressed in a very compact condition.

Another object of my invention is to provide an improved bale tie including the loop or eye at one end of the wire of the bale tie and a peculiarly and particularly formed hook at the other end thereof, which hook may be readily and easily engaged with the eye or loop, and will result in a tie about the bale that is extremely tight and, thus, will maintain the material in the bale in the proper baled condition.

Another object of my invention is to provide a bale tie of the hook and loop type which, when the ends are interengaged or interlocked, and under tension due to the expansion of the material that is baled, will, under such circumstances and conditions, result in a more effective interlocking of the hook and loop and a tighter baling of the material and, further, any accidental disengagement or distortion of the interengaged or interlocked hook and loop of the tie will be prevented.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a side elevational view showing the bale tie with the hook and eye fully engaged but not tensioned by an associated bale;

Fig. 2 is an enlarged view of the hook end of the bale tie shown in Fig. 3 of my Patent 2,223,109;

Fig. 3 is a view of the hook end formation of the bale tie;

Fig. 4 is a side elevational view showing my present bale tie with the loop and hook ends thereof about to be fully interengaged or interlocked on the bale of material;

Fig. 5 is a top plan view of the bale tie shown in Fig. 4;

Fig. 6 is a side elevational view of the bale tie wherein the hook and loop ends thereof are in full interengagement or interlocked condition about the bale of material;

Fig. 7 is a front elevational view showing the manner of insertion of the hook into the loop or eye end of the tie; and Fig. 8 is a view similar to Fig. 1 showing the loop about to enter the throat of the hook end of the bale tie.

The invention will be more readily understood by referring to the drawings in detail wherein like reference numerals in the several figures of the drawings all denote the same parts.

The bale tie consists of a length of wire, as usual, which includes the loop end thereof 9 and the hook end thereof 10. The loop 11 at the end 9 of the wire is generally ovate and is formed thereat by intertwisting the extreme free end 12 with about five tight twists 13 and with this extreme free end being very short and in contact with a short length of the loop end 9 adjacent the said twist and parallel with a bottom portion thereof when viewed in side elevation. This twisted end constitutes a shank portion at the loop end of the bale tie. The loop 11 is in the same general plane as the twisted end of the bale tie when viewed in side elevation. The side portion of the very first twist 14, immediately at the juncture where the loop 11 is formed and along with an adjacent end portion of the loop, provides a seat serving an important function later described and referred to herein.

The hook generally denoted at 15 is, of course, integral with the other end of the bale tie wire and, like the loop end, there are about five twists 16 of the hook end of the bale tie and, here too, there is a short extension of the free end 17 that is parallel with a bottom portion of the twisted end, as shown in the several figures of the drawing and for a purpose hereinafter described. This twisted end 16 constitutes a shank portion at the hook end of the bale tie.

This hook 15 is particularly and peculiarly formed in order to serve the purposes and functions hereinbefore and hereinafter set forth and it consists of an elongated bill 18 at one end thereof and a nose 19 at the other end thereof and an open throat 20 thereat. The particular formation of this hook is important and such formation includes the two overlapped and engaged portions of the wire 21 and 22 which form the bill of the hook which has a slightly rounded extreme end portion 23 and, continuing rearwardly from the overlapped and contacting portions 21 and 22 and integral therewith, there are portions thereof 24 and 25 which similarly diverge rearwardly toward the nose and throat formation, and integral with these diverging portions, and at the upper part thereof, the nose portion 26, which has a rounded end portion 27 and an interior contacting portion 28 including the curved closed throat end 29, with the other portion 30 which contacts the interior of an extension 31, completes the throat formation and the nose formation of the inner end of the hook.

It is to be distinctly noted that the entire bill portion 18 is directed slightly downwardly from the horizontal when viewed in side elevation for a purpose later named and that the portions 26 and 28 which form the nose and a part of the throat 20 are parallel to each other and substantially straight as are the portions 30 and 31 which complete the throat end formation of the hook and, of course, the overlapped portions 21 and 22 are likewise parallel with each other whereas the portions 24 and 25, which diverge outwardly, are also in a straight line formation even though they diverge from each other and form therebetween and with the closed end 29 a substantially triangular shaped opening O which is directly in the rear of the throat and in advance, of course, of the bill formation 18. All of the portions or parts of the hook when viewed either in plan or in side elevation are in the same plane as will be clearly evidenced by Fig. 5 of the drawings.

The point 32 of the bight of the nose 19 is disposed directly above the recessed seat 33 that is formed by the first twist or intertwisting of the end of the wire 17 with the end portion of the bale tie as shown in Fig. 3. By the particular disposition of the bight portion 32 of the nose being directly opposite the recess 33 formed by the first twist of the said wire, there is formed means that constitute what I term the first locking condition or position of the end portion 34 of the loop with the hook as clearly denoted in Fig. 4. I also provide a second locking condition of the hook within the throat 20 as denoted by the points 35 and 36, which points of locking being hereinafter more fully recited. The entire throat, including the rear interior closed portion thereof, is denoted at T.

The hook end of the bale tie as shown in Fig. 2 of the drawings, is prior art and is actually a reproduction of the hook end of Fig. 3 in my said Patent 2,223,109, and the purpose of showing this patented hook structure herein is to enable my present hook end of the bale tie to be more clearly distinguished and defined thereover. In the patented hook structure, as shown in Fig. 2, it will be noted that the overlapped ends of the bill 37 and 38, when viewed in side elevation, are substantially horizontally disposed as distinguished from the downward disposition of the bill 18 in my present bale hook structure. Moreover, it is to be noted that, in the patented hook structure in Fig. 2, at the juncture 39 where the bill structure emerges into the nose structure 40, the wire is somewhat depressed. In such a patented structure, as shown in Fig. 2, and when force is exerted on the bill structure thereof, the bill structure tends to bend at the said juncture 39, under said conditions of tension and the hook structure, therefore, is thus deformed and, under such circumstances and conditions, will be unintentionally and accidentally disconnected from the loop or eye end of the bale tie. My present hook structure, as embodied in this application, overcomes the objections to the bending and adds favorable functions that cannot possibly be attained in the use of the hook structure in my said bale tie prior patent and other prior art patents and as hereinafter more fully described. It will be noted that the extreme bight portion 41 of the patented hook shown in Fig. 2 of the drawings is not disposed directly above or opposite the recess 42 of the first twist of the wire adjacent the hook end as distinguished from the direct opposition or vertical alignment of these two points 32 and 33 as shown in my improved hook structure embodied in this application and, additionally, the downward disposition of the bill 18 of the improved hook structure in the application differs from my patented structure and functions entirely differently and more efficiently than the patented hook structure.

In Fig. 1 of the drawings, I have disclosed the hook and loop end of the bale tie in fully interengaged or interlocked condition but not tensioned by an associated bale. This illustration was chosen to clearly indicate the obtuse angle relationship of the hook end 10 of the bale wire with respect to the horizontally disposed loop or eye end 9 of the bale tie. It will be noted from Fig. 1 that the underside 43 of the bight portion of the bill 18 rests in the seat that is effected by the first twist of the wire denoted at 14 and an adjacent portion of the loop and that a portion of this nose is, when viewed in front elevation, disposed in front of the said first twist of the wire and in the seat at one side thereof as clearly seen in Fig. 1 and, as a consequence, the entire hook 15 will be canted slightly out of horizontal relationship with respect to the bale tie as a whole as denoted in Fig. 5 of the drawing. In other words, the bill formation 18 being positioned in or on the said seat results in shifting the hook laterally to one side of the twisted formation of the end portion of the loop end 9 of the bale tie wire. In Fig. 1, the end 34 of the loop 11 is seated fully within the throat T and engages the closed end wall therein and, in this position of the loop with respect to the throat of the hook, these two elements are in their completed or final interlocking or interengaging relationship with each other.

In Fig. 4 of the drawings, the extreme end 34 of the loop 11 is shown in its first interengaging or interlocking relationship with the mouth of the hook 15 and it will be noted that this end portion 34 of the loop or eye is gripped at the point 32 of the bight of the nose which rounds into the interior of the mouth of the hook at the top thereof and that a substantially diametrically oppositely disposed part of the loop end 34 is firmly seated in the recessed seat 33 caused or effected by the first said twist of the wire adjacent the hook at the upper portion thereof. When this end 34 of the loop 11 is in the position as shown in Fig. 4, naturally the bill end formation 18 of the hook will overlap several of the twists at the end of the loop end 9 of the bale wire and it will be noted that the said ends of the bale wire carrying the loop and hook formation respectively thereon are separately disposed outwardly or above the top 44 of the bale of preferably compressible material such as hay or the like B which enables the hook 15 to be easily and readily inserted through the loop or eye 11 and which hook is shown partially inserted through the said loop in Fig. 7 of the drawings. It is simply necessary to cant the respective ends of the bale tie with the loop and hook thereon and the entire hook 15 can then be easily threaded or slipped through the loop and, with a slight pull of the loop end, the extreme end portion 34 thereof will be placed or brought into the first locking position or condition as shown in Fig. 4 of the drawings. It is understood that, when the bale tie is applied as in Fig. 4 of the drawings, the material B is under compression and hence the ends of the bale tie may be lifted outwardly therefrom in order to effect the first interlocking or interengaging condition or position of the elements as shown in Fig. 4 and, when such condition or position of the said elements has been attained, and the compressed material of the bale B is released, the said material will then immediately expand and the end 34 of the loop will then be brought into engagement with the closed end 29 of the throat T as shown in Fig. 6 and the bill 18 of the hook will have its bottom portion thereof 43 seated in the seat that is provided by the first twist of the wire at the end adjacent the loop thereat and that the hook generally will be canted slightly out of horizontal by reason of this association of the bill end of the hook with the first twist in the loop or eye end of the bale wire. Thus, it will be seen that the hook end 10 of the bale wire, from its original obtuse angled relationship with the end 9 thereof, will, from that relationship, and when in the first locking position, assume the angled relationship as shown in Fig. 4 and, in the second or final interlocking or interengagement of the loop with the hook end of the bale wire, this end 10 of the bale wire will be brought almost into substantial horizontal alignment with the end 9 thereof. Thus, under these circumstances, and where the bale wire and the hook and loop connection are under considerable tension, force will be exerted on the bill end 43 where it engages in the seat through the inclined portion 24 of the hook and to the said nose portion 19 thereof, and actually at least slightly move the nose portion downwardly and thus form a positive interlocking or interengagement of the loop with the hook end of the bale. Additionally, the pressure that is exerted by the end 34 against the closed throat 29 of the hook will, likewise, transmit force through the straight portions 26 and 28 of the nose to tend to close the throat opening 29 and further prevent any accidental disassociation of the loop or eye from the hook.

It will be clear that the outward force exerted by the bale material B will tend to force both the twisted ends with the loop and hook thereon outwardly and, as the bill of the hook is disposed at the first twist of the wire in the seat at the loop end 9 of the bale tie, there is a constant tendency for the outward pressure or force to force this bill upwardly when viewed as in Fig. 6 and, consequently, to transmit that force to force the nose end 19 of the hook downwardly and thus effectively secure the hook and loop ends of the bale wire together while the pressure of the baled material forces the straight arms 30, 31 toward the nose portion.

The inclined portions 24 and 25 and the closed end portion 29 of the throat may be said to constitute a strut structure whereby the entire hook formation is stabilized and, as these formations 24 and 25 are straight, so to speak, any force that is exerted thereon by the bill or any other portion of the hook, rather than tending to bend the bill of the hook or other part thereof, will be transmitted to the nose formation to actually slightly force this nose formation downwardly when viewed as in Fig. 6, to effectively hold or maintain the end of the loop therein and prevent any accidental displacement therefrom. This strut structure also reinforces the elongated, downwardly disposed bill end portion 18 of the hook and prevents any accidental bending upward or downward thereof. Due to the straight alignment of the strut structure, including the portions 24 and 25 of the hook, any upward or downward bending of the elongated bill 18 thereof is positively prevented. When the end 34 of the loop 11 is in full interlocking or interengaging relationship with the hook, as shown in Fig. 6, and when the tie is under tension, there will be a tendency to force the bill portion 18 of the hook downwardly, but bending of the same is prevented and thus insuring at all times the proper locking together of the loop and hook and, further, with the change of the throat of the hook in the present application, when severe tension takes place, this also draws down the nose of the hook to prevent any accidental disengagement of the loop from the hook or vice versa.

Due to the particular shape of the hook, the operator can readily insert the same in and through the loop at a much greater angle than the prior art affords and, therefore, effect a much tighter baling of the material. Furthermore, due to the shape of the hook, the operator can shove the hook through the grooves in the boards that separate the bales of hay in the hay baler when these boards are chipped or broken and, under such circumstances the hay or the like gets into the grooves of the boards, but nevertheless, the hooks of the present bale tie can be easily and readily inserted into these said grooves and the hook ends of the ties are inserted into the loops and readily interengaged about the bale of hay or the like. The short cut-off ends or extensions of the opposite ends of the wires 12 and 17 being in engagement with the bale wire, preferably at the bottom thereof when viewed in side elevation, prevents any tangling of the bale ties and the hook or loop formations thereof when the same are in a bundle and when the individual bale ties are withdrawn from the bundle.

Briefly, the loop and hook ends of my bale tie are brought together by interengaging the same by threading or slipping the hook through the loop as partially depicted in Fig. 7, and then the twisted ends are brought into substantially the position as shown in Fig. 8 with the extreme end portion 34 thereof resting right in the entrance of the throat of the hook but not locked therein or interlocked therewith and, from this initial position, the extreme end 34 of the loop is drawn or pulled into the first locking position as denoted in Fig. 4 of the drawings and then past the second locking position or condition denoted at opposite points 35 and 36 in Fig. 6. Finally, the loop, due to expansion of the material being baled, or by being manually pulled, has the extreme end portion thereof disposed against and in contact with the closed end 29 of the throat of the hook and, when in such position or condition, and as hereinbefore described, the loop and the hook will be effectively interengaged or interlocked with each other and any accidental displacement of one with respect to the other is positively prevented and the bale of material is, therefore, effectively and tightly baled and maintained in such condition indefinitely until the bale ties are intentionally and purposely removed therefrom.

I claim:

1. A bale tie comprising a wire having twisted shank portions at its ends and terminating in a loop with an opening therein at one end thereof and an upwardly extending hook at the opposite end thereof, the first twist portion of the wire adjacent the loop being inclined downwardly and rearwardly from the top and at one side of the wire and with a portion of the loop at said one side of the wire constituting a seat, the hook including an elongated bill portion consisting of parallel wire portions, disposed at an obtuse angle with respect to the horizontal disposition of the wire extending from the hook, which parallel wire portions terminate in parallel wire portions that constitute a throat forming said hook and which has an open end and a closed end, the open end of the throat being of slightly lesser dimensions than the cross-sectional dimension of the wire loop, so that when the loop is disposed in the throat in the absence of pressure and/or tension the hook end of the bale wire is at an obtuse angle with respect to the loop end of the bale wire, and when under pressure and/or tension the said hook and loop ends of the tie are brought into substantial horizontal alignment with the bill portion of the hook resting in the said seat adjacent the loop and serving to apply force to the throat portion of the hook.

2. A wire bale tie as defined in and by claim 1 wherein the hook includes a nose structure having a bight portion and the open end of the throat is defined by the bight portion of the nose structure thereof, the first twist of the wire of the shank of the hook forming a recessed seat on the top thereof which is in spaced alignment with the bight portion of the nose structure, the dimensions of the opening that is defined by the bight portion of the nose structure and the recessed seat being slightly less than the cross-sectional dimension of the wire loop and constituting a first locking condition for the loop, the throat structure inwardly of the first locking condition constituting a second locking condition for the loop so that when pressure and/or tension is exerted on the bale tie the loop engages in the first locking condition and is held and due to additional pressure and/or tension the loop will engage in the second locking condition of the hook.

3. A bale tie comprising a wire having twisted shank portions at its ends and terminating in a loop with an opening therein at one end thereof and an upwardly extending hook at the opposite end thereof, the first twist portion of the wire adjacent the loop being inclined downwardly and rearwardly from the top and at one side of the wire and with a portion of the loop at said one side of the wire constituting a seat, the hook including an elongated bill portion consisting of parallel wire portions disposed at an obtuse angle with respect to the horizontal disposition of the wire extending from the hook, which parallel wire portions terminate in parallel wire portions that constitute a throat forming said hook and which has an open end and a closed end, the open end of the throat being of slightly lesser dimensions than the cross-sectional dimension of the wire loop, the closed end being disposed toward said bill and in alignment therewith, the cross-sectional width of the said throat formation of the hook being substantially greater than the cross-sectional width of the said bill, the length of the bill portion of the hook including the closed end portion of the throat being greater than the opening in the loop, so that when the loop is disposed in the throat in the absence of pressure and/or tension the hook end of the bale wire is at an obtuse angle with respect to the loop end of the bale wire, and when under pressure and/or tension the said hook and loop ends of the tie are brought into substantial horizontal alignment with the bill portion of the hook resting in the said seat adjacent the loop and serving to apply force to the throat portion of the hook.

4. A wire bale tie as defined in and by claim 3 wherein the hook includes a nose structure having a bight portion and the open end of the throat is defined by the bight portion of the nose structure thereof, the first twist of the wire of the shank of the hook forming a recessed seat on the top thereof which is in spaced alignment with the bight portion of the nose structure, the dimensions of the opening that is defined by the bight portion of the nose structure and the recessed seat being slightly less than the cross-sectional dimension of the wire loop and constituting a first locking condition for the loop, the throat structure inwardly of the first locking condition constituting a second locking condition for the loop so that when pressure and/or tension is exerted on the bale tie the loop engages in the first locking condition and is held and due to additional pressure and/or tension the loop will engage in the second locking condition of the hook.

ERNEST F. W. KEIHL, Jr.

REFERENCES CITED

The following references are of record in the file of this patent:

UNITED STATES PATENTS

| Number | Name | Date |
| --- | --- | --- |
| 445,828 | Baer | Feb. 3, 1891 |
| 448,964 | Kilmer | Mar. 24, 1891 |
| 468,467 | Robinson | Feb. 9, 1892 |
| 662,558 | Dederick | Nov. 27, 1900 |
| 885,917 | Ferris | Apr. 28, 1908 |
| 2,004,732 | Rowe | June 11, 1935 |
| 2,032,285 | Keihl, Jr. | Feb. 25, 1936 |
| 2,223,109 | Keihl, Jr. | Nov. 26, 1940 |